(12) United States Patent
Feygin

(10) Patent No.: US 6,964,358 B2
(45) Date of Patent: Nov. 15, 2005

(54) EM-ACTUATED LIQUID DISPENSER

(75) Inventor: Ilya Feygin, Mountainside, NJ (US)

(73) Assignee: TechElan, LLC, Mountainside, NJ (US)

(*) Notice: Subject to any disclaimer, the term of this patent is extended or adjusted under 35 U.S.C. 154(b) by 0 days.

(21) Appl. No.: 10/442,382

(22) Filed: May 21, 2003

(65) Prior Publication Data
US 2004/0232172 A1 Nov. 25, 2004

(51) Int. Cl.[7] .................................................. B67D 3/00
(52) U.S. Cl. ................................... 222/504; 222/564
(58) Field of Search ........................... 222/504, 564

(56) References Cited

U.S. PATENT DOCUMENTS

| | | | | |
|---|---|---|---|---|
| 3,189,223 A | * | 6/1965 | Mackal | ............................ 222/1 |
| 4,100,550 A | * | 7/1978 | Elmqvist et al. | ............... 347/39 |
| 4,240,081 A | * | 12/1980 | Devitt | ............................ 347/39 |
| 5,009,046 A | * | 4/1991 | Johinke | ........................ 52/197 |
| 5,685,459 A | * | 11/1997 | Wardle | ...................... 222/146.6 |
| 5,848,751 A | * | 12/1998 | Wang et al. | .................. 239/420 |
| 6,357,719 B1 | * | 3/2002 | Yakovenko | .................. 248/689 |

* cited by examiner

Primary Examiner—Joseph A. Kaufman
(74) Attorney, Agent, or Firm—DeMont & Breyer, LLC

(57) ABSTRACT

A liquid dispenser that dispenses liquid via the action of a collapsing tube. The illustrative dispenser includes a liquid-carrying tube, a wire, and a magnet. The magnet is shaped to receive the tube and the wire between an elongated North pole and an elongated South pole. A pulse of current of controlled amperage and duration is sent through the wire, which causes it to deflect. This causes the tube to collapse with the result that a portion of the liquid that is contained in the tube is ejected.

8 Claims, 6 Drawing Sheets

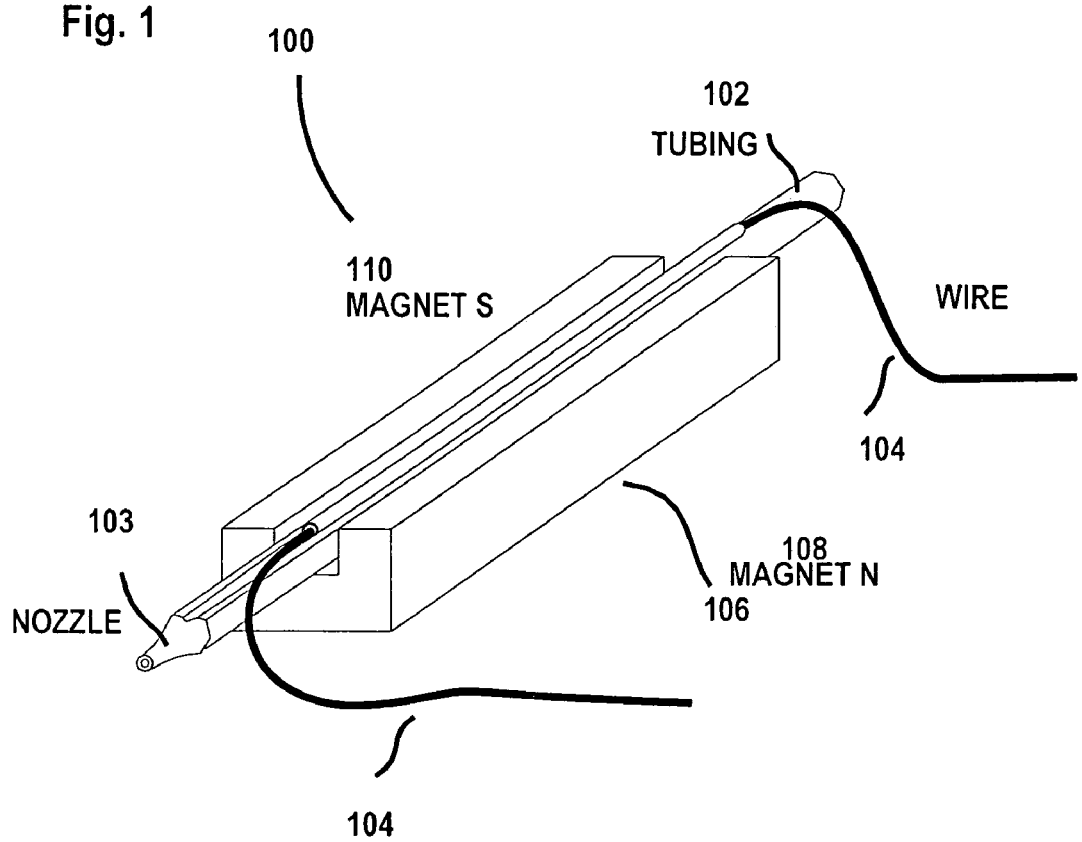

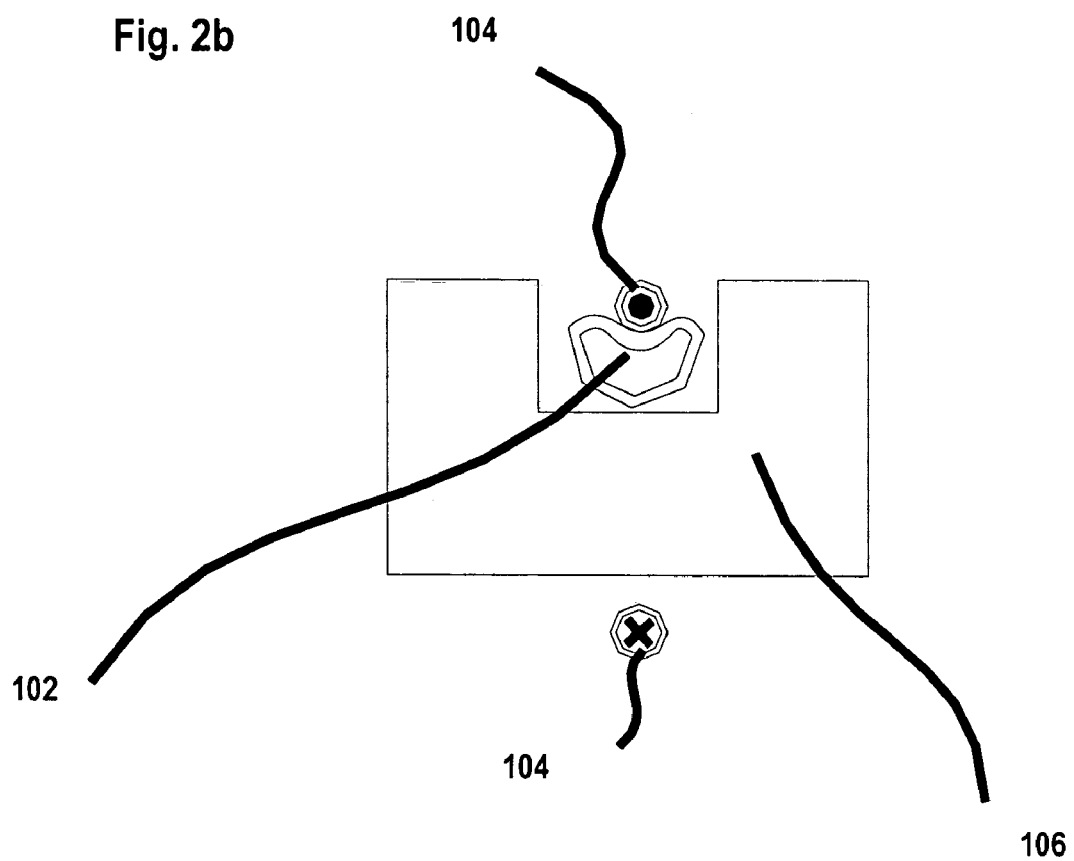

EM-ACTUATED LIQUID DISPENSER

FIELD OF THE INVENTION

The present invention relates to liquid dispensers for dispensing small quantities of liquid.

BACKGROUND OF THE INVENTION

Sub-micro liter dispensing of liquid is a substantial challenge facing pharmaceutical, medical and other industries due to the strong proliferation of miniaturization technologies.

Among major obstacles of small-volume dispensing is the necessity to separate a known small volume from the bulk of a body of liquid. This separation is usually accomplished via a quick release of kinetic energy, which is transferred into motion of a small amount of liquid (i.e., the small volume that is separated from the bulk).

Enabling technologies include, for example, piezo-dispensation and heat-bubble dispensation, as used in the printing industry. The heat bubble is not applicable to bio- and medical-related applications. And the piezo technique is very restrictive and typically works well only with exceedingly small volumes of liquid (i.e., less than 5 nanoliters), with "well-behaved" liquid (i.e., ink) and under perfect conditions.

Consequently, there is a need for a broadly-applicable technique for small volume dispensing.

SUMMARY

The illustrative embodiment of the present invention is a dispenser that avoids at least some of the drawbacks of the prior art. In the illustrative dispenser, which is actuated by electromagnetism, liquid is dispensed using "collapsing-wall dispensation," which can be controlled for dispensations ranging from nano-liters to micro-liters with high accuracy.

The illustrative dispenser includes a liquid-carrying tube, a wire, and a magnet. The magnet is shaped to receive the tube and the wire between an elongated North pole and an elongated South pole.

A pulse of current of controlled amperage and duration is sent through the wire, which causes it to deflect. This causes the tube to collapse with the result that a portion of the liquid that is contained in the tube is ejected. The portion of liquid ejected is proportional to the speed and degree of deflection. In some embodiments, the shape of tube is restored by the intrinsic resilience of the tube.

BRIEF DESCRIPTION OF THE DRAWINGS

FIG. 1 depicts an EM-actuated dispenser in accordance with the illustrative embodiment of the present invention.

FIG. 2B depicts a cross-sectional end view of the EM-actuated dispenser of FIG. 1, wherein the dispenser is actuated.

DETAILED DESCRIPTION

Figure 2A:
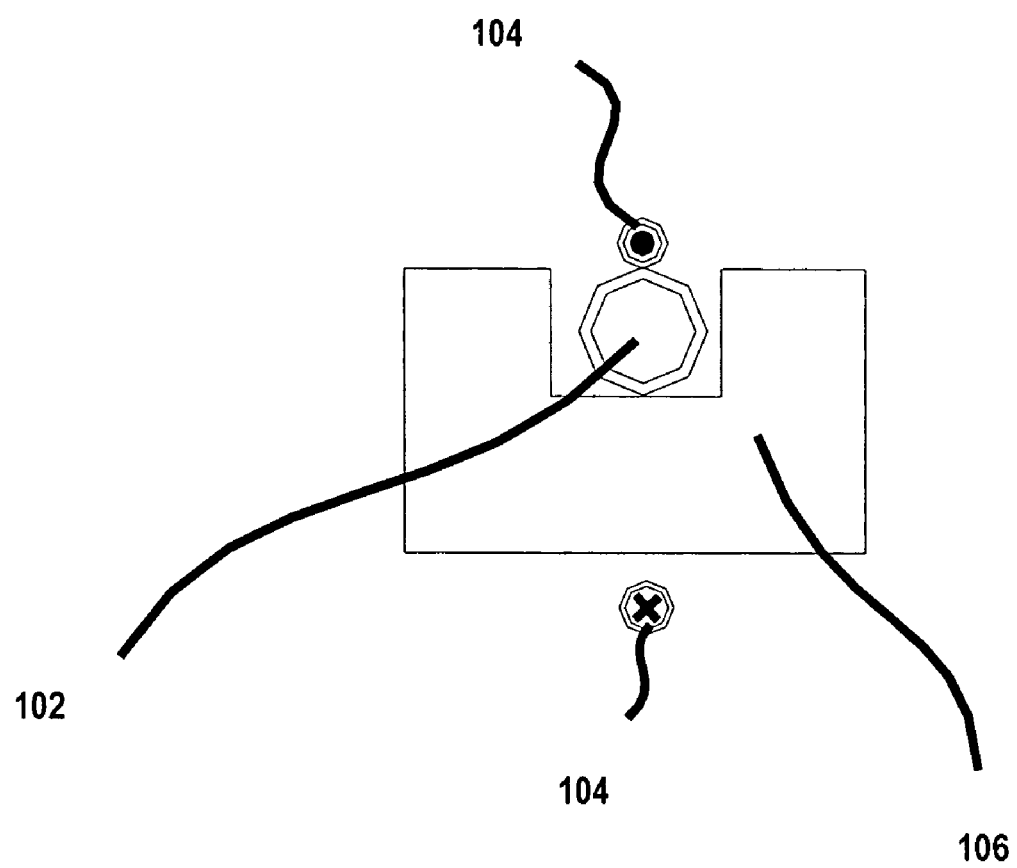
FIG. 2A depicts a cross-sectional end view of the EM-actuated dispenser of FIG. 1, wherein the dispenser is not actuated.

FIG. 1 depicts EM-actuated liquid dispenser 100 in accordance with the illustrative embodiment of the present invention. Dispenser 100 includes liquid-carrying tube 102, wire 104, and magnet 106.

Liquid-carrying tube 102 is advantageously a capillary, which holds liquid through the capillary action. Any one of a variety of resilient and relatively chemically-resistant plastics or rubber, such as Teflon™ tubing by Gore, silicone, Chemrez, Calrez tubing, and the like, can suitably be used to form tube 102. In some embodiments, the internal diameter of tube 102 is one millimeter or less.

Wire 104 is disposed along tube 102. In some embodiments, wire 104 is extruded with tubing 102, whereas in some other embodiments, it is simply attached to tubing 102. Wire 104 is advantageously capable of carrying current in the range of about 10 to 30 amperes (or more) without substantial heating.

Magnet 106 is shaped to receive tube 102 and wire 104 between elongated North pole 108 and elongated South pole 110. In the illustrative embodiment, the gap between poles 108 and 110 is in a range of about 3 to 5 millimeters.

In the illustrative embodiment, wire 104 is attached along the top of tube 102 and returns "beneath" the magnet, forming a "loop" that is parallel to the long axis of the tubing. (See, e.g., FIGS. 2A and 2b).

Figure 3:
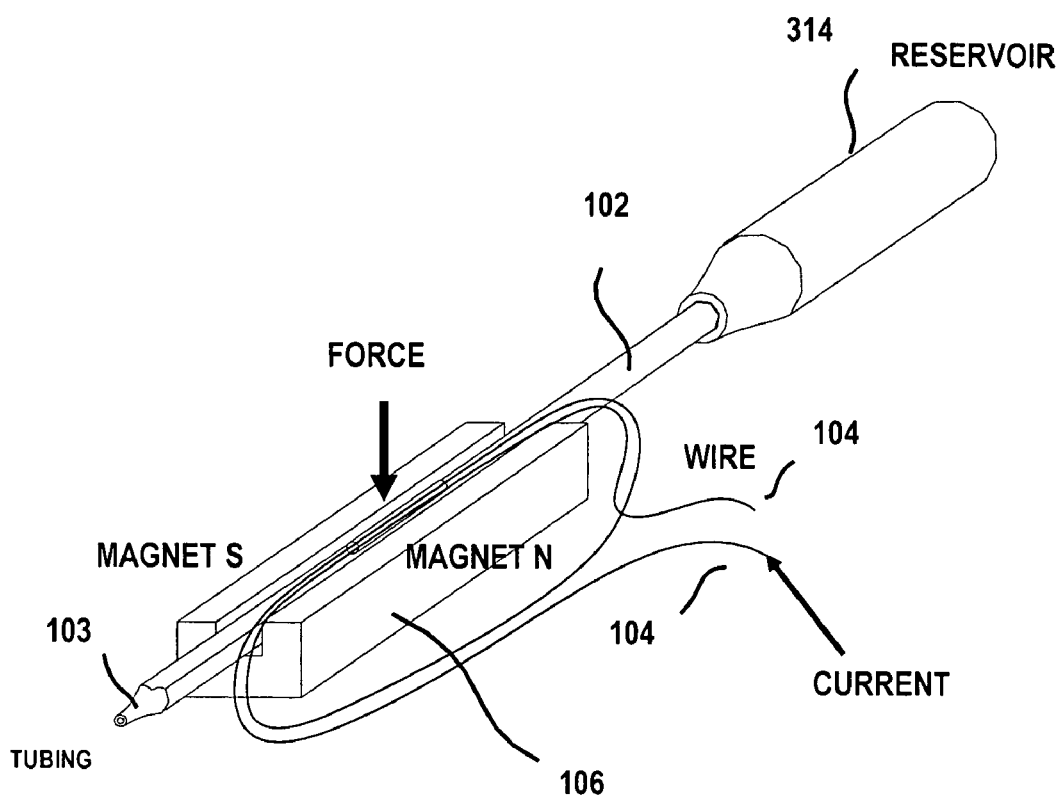
FIG. 3 depicts an EM-actuated dispenser with multiple turns of wire to increase the strength of the dispensing pulse.

A pulse of current of controlled amperage and duration is sent through wire 104, which causes it to deflect. This causes tube 102 to collapse. As a consequence, liquid is ejected from the tube. The portion of liquid ejected is proportional to the speed and degree of deflection. The magnitude of the current pulse defines the deflection. The shape of the pulse can be adjusted as a function of liquid viscosity and other dispensing parameters. Increasing the number of turns or "loops" of wire 104, as depicted in FIG. 3, increases the force by which liquid is ejected from tube 102.

In some embodiments, the shape of tube 102 is restored by virtue of the intrinsic resilience of the tube. In some other embodiments, restoration is generated or enhanced via a current pulse of opposite polarity. Capilllary forces will restore the original level of liquid inside tube 102 after its shape is restored.

During the collapse of tube 102, liquid moves in both directions away from the collapse. Typically, movement in only one direction is desired. Motion in the undesired direction can be reduced in several ways.

Figure 4:
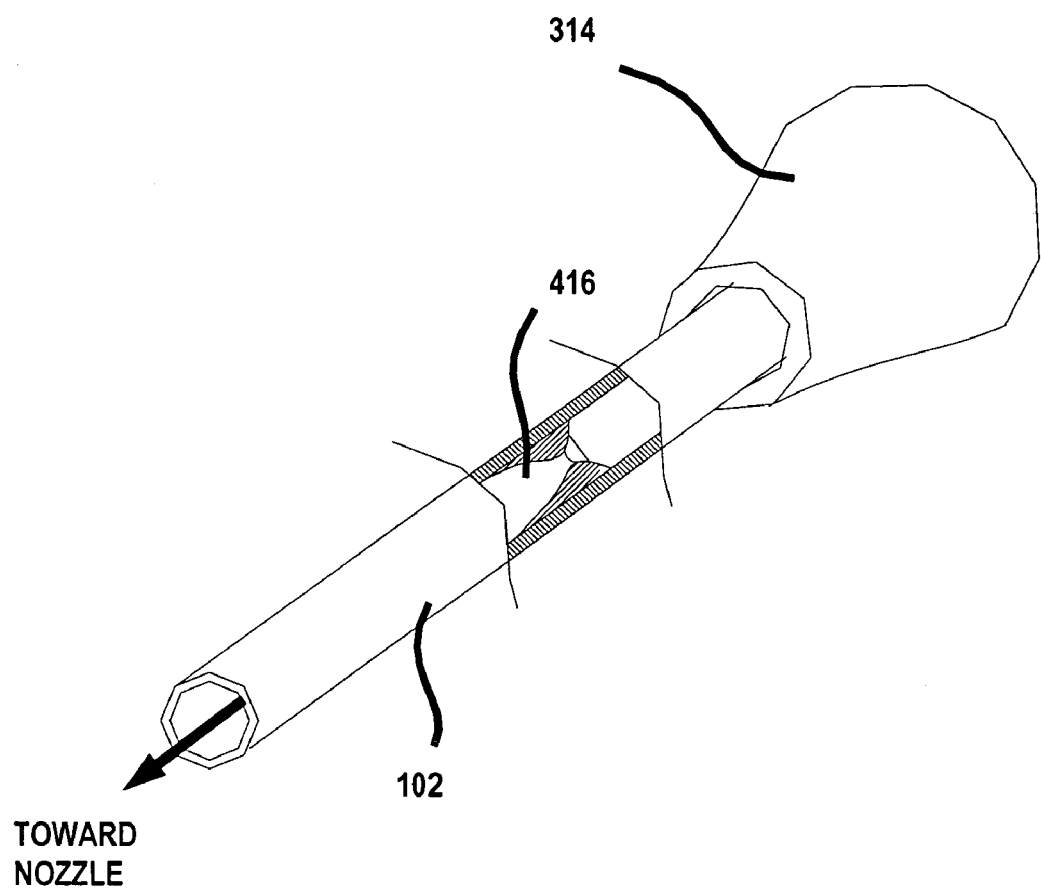
FIG. 4 depicts an EM-actuated dispenser with a dynamic valve to restrict the direction of flow of liquid.

One way to do so is to use a "dynamic" valve. A dynamic valve is a tapered orifice, which widens in the direction of desired liquid flow. Due to the fluid dynamics, liquid that is subjected to rapid movement, as in dispenser 100, sees much higher resistance going into the taper than out of the taper. This creates, in essence a dynamic check valve, as is known in the art. FIG. 4 depicts dynamic valve 414 in tube 102.

Figure 5:
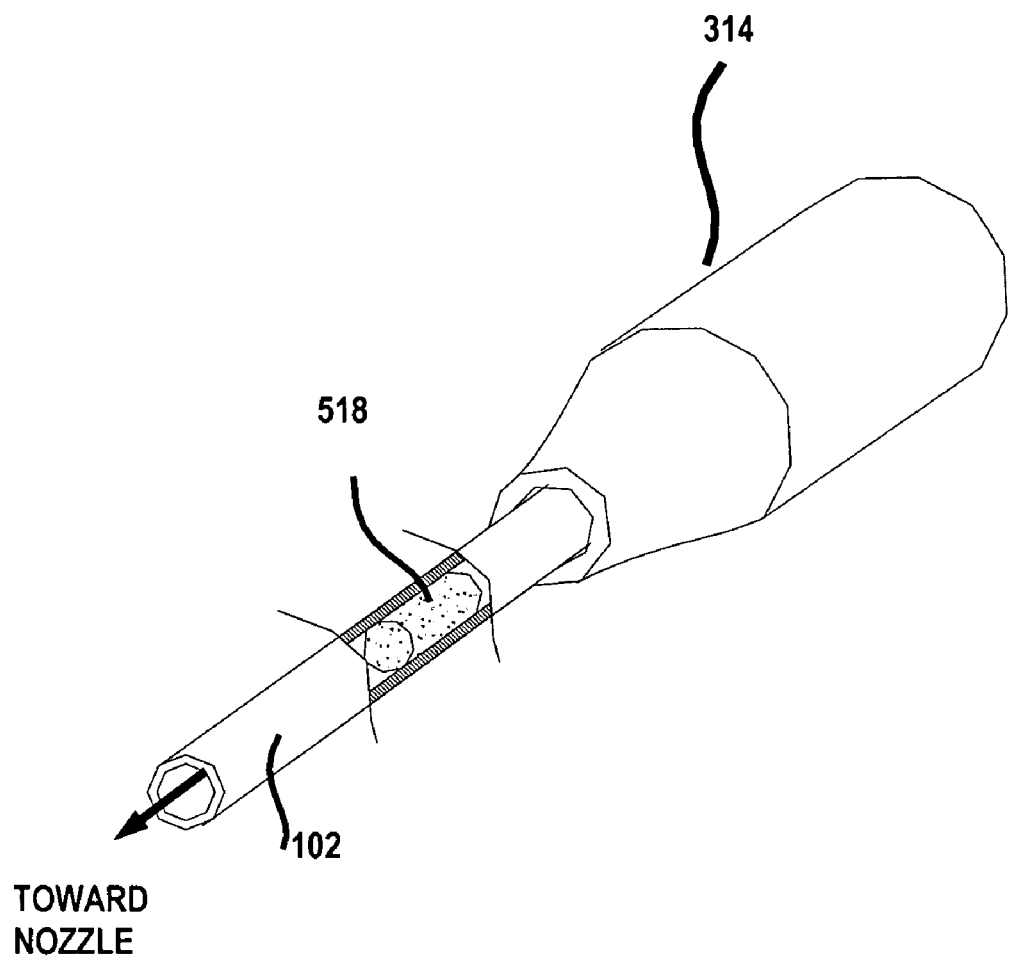
FIG. 5 depicts an EM-actuated dispenser with a sponge to restrict the direction of flow of liquid.

Another way to restrict the flow of liquid in dispenser 100 to a single desired direction is to use an open cell sponge. Properly located inside tube 102, the sponge has a low static resistance to the flow of liquid and does not impede the filling or refilling of tube 102. On the other hand, the sponge has a high dynamic resistance to faster moving fluid, such as is caused during the dispensing operation. FIG. 5 depicts sponge 518 in tube 102.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

I claim:

1. An apparatus comprising:
   a capillary tube, wherein said capillary tube is reversibly collapsible;
   a wire disposed along said capillary tube;
   a current source that is electrically coupled to said wire; and
   a magnet, wherein said magnet is shaped to receive said capillary tube and said wire between a north pole and a south pole, and wherein:
   in a first state, said current source generates a current, wherein said current is transmitted through said wire, which, in the presence of said magnet, causes said wire to deflect and said capillary tube to collapse; and
   in a second state, wherein there is an absence of current in said wire, an original, un-collapsed state of said capillary tube is restored or maintained.

2. The apparatus of claim 1 further comprising a liquid reservoir, wherein said liquid reservoir is coupled to said capillary tube.

3. The apparatus of claim 2 further comprising a dynamic valve that is disposed between said capillary tube and said liquid reservoir, wherein said dynamic valve includes a region that is tapered such that a first end of said region has a larger area for flow than a second end of said region, and further wherein said first end of said region is proximal to said liquid reservoir.

4. The apparatus of claim 2 further comprising an open-celled sponge that is between said capillary tube and said liquid reservoir.

5. The apparatus of claim 1 wherein said magnet has a "C" shape.

6. The apparatus of claim 5 wherein a gap between said north pole and said south pole of said magnet is in a range of about 3 millimeters to about 5 millimeters.

7. The apparatus of claim 1 wherein said capillary tube has an internal diameter that is less than about 1 millimeter.

8. The apparatus of claim 1 wherein said capillary tube is resilient.

* * * * *